3,105,847
P-N,N-DI-(2-CHLOROETHYL)-AMINOPHENOXY-ALKANOIC ACIDS AND ALKYL ESTERS THEREOF

Walter Charles Joseph Ross and Walter Davis, both of London, England, assignors to National Research Development Corporation, London, England, a British corporation
No Drawing. Filed Oct. 12, 1956, Ser. No. 615,455
Claims priority, application Great Britain Mar. 10, 1953
2 Claims. (Cl. 260—471)

This invention relates to chemotherapeutic agents and has as an object to provide improved compounds having tumour growth inhibitory action. The present application is a continuation in part of application Serial No. 413,724, filed March 2, 1954, now abandoned.

Bis-chloroethylamines of the general formula $$RN(CH_2CH_2Cl)_2 \quad (I)$$

(in which R is an aliphatic residue) are well known as cytotoxic agents which are capable of arresting the growth of transplanted animal tumours (see Haddow, Brit. Med. Bull. (1947), 4, 422). One disadvantage of the compounds so far examined which limits their use as chomotherapeutic agents is the non-specificity of their action. They are toxic to all types of rapidly proliferating tissue, e.g. bone marrow, gonadal tissue and gastric mucosa, as well as towards neoplastic tissues.

According to the present invention the novel chemotherapeutic agents are compounds of the feneral formula:

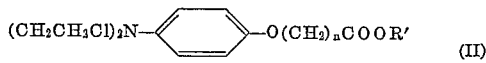
(II)

in which R' is hydrogen or a methyl or ethyl radical and n is an integer of from 1 to 4.

All the compounds of the general formula

where n is 1, 2, 3 or 4 are effective tumour growth inhibitors when tested against transplanted Walker rat carcinoma.

The compound of the formula:

i.e. p - N,N - di - (2 - chloroethyl) - aminophenoxypropionic acid, has particularly good tumour growth inhibitory action.

The present invention includes a process for the manufacture of compounds of the general Formula II above wherein a compound of the general formula:

in which R'' is selected from the group consisting of methyl and ethyl radicals and n is an integer of from 1 to 4 is treated with phosphorus oxychloride to form a compound of the general formula:

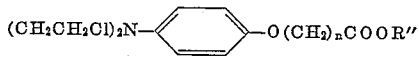

which, if desired, is converted by hydrolysis in an acid medium into a compound of the general formula:

The following examples, in which the parts are by weight, illustrate the invention:

EXAMPLE 1

*p-N,N-Di-(2-Chloroethyl)-Aminophenoxyacetic Acid*

Ethyl p-aminophenoxyacetate (19 parts), ethylene oxide (10 parts), N-acetic acid (25 parts) were stirred at room temperature for four hours, then allowed to stand overnight. The resulting ethyl p-N,N-di-2-hydroxyethyl-aminophenoxyacetate (4 parts), phosphorus oxychloride (5 parts) and chloroform (25 parts) were heated under reflux for one hour. Hydrolysis of the ethyl p-N,N-di-(2-chloroethyl)-aminophenoxyacetate (1 part) with concentrated hydrochloric acid (5 parts) was achieved by refluxing for thirty minutes. Neutralization with ammonia and extraction with ether gave p-N,N-di-(2-chloroethyl)-aminophenoxyacetic acid which was recrystallized from benzene/light petroleum, 60–80° C., M.P. 105° C.

EXAMPLE 2

*p-N,N-Di-(2-Chloroethyl)-Aminophenoxypropionic Acid*

Methyl p-aminophenoxypropionate (7 parts), ethylene oxide (10 parts) and N-acetic acid (25 parts) was stirred at room temperature for four hours and allowed to stand overnight. Removal of ethylene oxide and extraction with chloroform gave methyl p-N,N-di-2-hydroxyethyl-aminophenoxypropionate, which on recrystallization from benzene had a melting point of 68° C. in a yield of 7 parts. Chlorination of this compound (7 parts) with phosphorus oxychloride (7 parts) and benzene (50 parts) gave, after one hour's refluxing, methyl p-N,N-di-(2-chloroethyl)-aminophenoxypropionate which was recrystallized from benzene and had a melting point of 51° C. This was hydrolyzed, using an equal amount of concentrated hydrochloric acid, to give p-N,N-di-(2-chloroethyl)-aminophenoxypropionic acid which was recrystallized from cyclohexane and had a melting point of 93° C.

EXAMPLE 3

*p-N,N-Di-(2-Chloroethyl)-Aminophenoxybutyric Acid*

Methyl p-aminophenoxybutyrate (10 parts), ethylene oxide (20 parts) and N-acetic acid (25 parts) were stirred for four hours. Removal of ethylene oxide and extraction with chloroform gave methyl p-N,N-di-2-hydroxy-ethylaminophenoxybutyrate which was recrystallized from benzene/cyclohexane and had a melting point of 57° C. This compound (5 parts), phosphorus oxychloride (5 parts) and benzene (40 parts) were refluxed together for an hour to give methyl p-N,N-di-(2-chloroethyl)-amino-phenoxybutyrate which recrystallized from carbon tetrachloride/light petroleum, 40–60° C., and had a melting point of 65° C. Hydrolysis of this methyl ester (2 parts) with concentrated hydrochloric acid (2 parts) gave p-N,N-di-(2-chloroethyl)-aminophenoxybutyric acid which was recrystallized from cyclohexane and had a melting point of 85.5° C.

Experiments were carried out which showed the inhibition of the Walker rat carcinoma by the compounds of the present invention.

In each case transplanted Walker rat carcinoma was used employing the technique described by Badger, Elson, Haddow, Hewett and Robinson (Proc. Roy. Soc., 1942, B 130, 255) and Haddow, Harris, Kon and Roe (Phil. Trans. Roy. Soc., 1948, A 241, 147). In each experiment 10 rats were treated with a single dose of a compound of the invention and ten other rats were used as controls. The tumours were not always weighed in all the controls as some tumours in the controls were used as initial materials for further experiments.

The results are shown in the following table:

| Compound | Dose, mg. | Duration, days | Weight of tumour in gms. | |
|---|---|---|---|---|
| | | | Controls | Treated |
| Ethyl p-(di-2-chloroethyl) aminophenoxy acetate | 5 | 14 | 40, 35, 34, 33, 33, 27, 17, 16. | 4, 4, 1. No tumours in the remaining seven animals |
| p-(Di-2-chloroethyl) aminophenoxyacetic acid | 3 | 14 | 24, 23, 15, 11, 6, 3, 3, 3. | No tumours in any of the animals. |
| p-(Di-2-chloroethyl) aminophenoxypropionic acid | 1 | 14 | 24, 23, 15, 11, 6, 3, 3, 3. | No tumours in any of the animals. One animal died. |
| p-(Di-2-chloroethyl) aminophenoxybutyric acid | 1 | 14 | 35, 23, 19, 18, 16, 14, 12, 8, 6. | No tumours in any of the animals. |
| p-(Di-2-chloroethyl) aminophenoxyvaleric acid | 2 | 15 | 23, 16, 16, 8, 3, 3, 2 No tumours in two of the animals. | 1, 0.5. No tumours in the other eight animals. |

We claim:

1. A compound of the formula:

in which R' is selected from the group consisting of hydrogen, methyl and ethyl radicals and $n$ is an integer of from 1 to 4.

2. p - N,N - di - (2 - chloroethyl) - aminophenoxypropionic acid.

References Cited in the file of this patent

FOREIGN PATENTS 128,912    Great Britain _____ Oct. 30, 1919
738,415    Great Britain _____ Oct. 12, 1955

OTHER REFERENCES

Everett et al.: Chem. Abstr., 44, 1431–2 (1950).